United States Patent
> Riley et al.

[15] 3,661,634

[45] May 9, 1972

[54] SEMIPERMEABLE OSMOTIC MEMBRANE AND METHOD OF PRODUCING SAME

[72] Inventors: Robert L. Riley, La Jolla; Clifford R. Lyons, San Diego, both of Calif.

[73] Assignee: The United States of America as represented by the Secretary of the Interior

[22] Filed: Oct. 31, 1969

[21] Appl. No.: 873,116

[52] U.S. Cl..................117/161 UA, 117/124 E, 161/109, 161/112, 161/190, 210/500, 260/2.5 AY, 260/2.5 AT, 264/41, 264/49
[51] Int. Cl.........................................C09d 3/72, C09d 5/20
[58] Field of Search.................117/124 E, 161 UA, 161 UN, 117/98, 99; 264/41, 49; 161/109, 112, 190; 260/2.5 AY, 2.5 AT; 210/500

[56] References Cited

UNITED STATES PATENTS 3,171,799   3/1965   Batchelder.........................210/500 X
3,216,579   11/1965   Shelanski et al. ..................210/500 X
3,332,894   7/1967   Cantor et al........................264/41 X

OTHER PUBLICATIONS

Saline Water Conversion Report, 1968, U.S. Dept. of the Interior, pages 123– 125.

Markle et al., pages 22– 25, 1964, Development of Improved Membranes...Dialysis

*Primary Examiner*—William D. Martin
*Assistant Examiner*—Bernard D. Pianalto
*Attorney*—Ernest S. Cohen and Gersten Sadowsky

[57] ABSTRACT

Semipermeable membranes prepared from a mixture of vinylpyrrolidone polymers and polyisocyantes. Process for preparing such membranes by casting the mixture from solution onto a smooth surface followed by curing under conditions of controlled humidity. Reaction of polyisocyanates with certain compounds having an active hydrogen atom provides a "-blocked" polyisocyanate which does not react immediately with water at ambient temperatures thereby allowing greater processing control of membrane production.

6 Claims, No Drawings

SEMIPERMEABLE OSMOTIC MEMBRANE AND METHOD OF PRODUCING SAME

This invention relates to semipermeable membranes, and more particularly to such membranes which are prepared from vinylpyrrolidone polymers and polyisocyanates, and to processes for making such semipermeable membranes.

It is known to employ semipermeable membranes to separate various components from various fluid mixtures. For example, semipermeable membranes are employed to separate liquid components from a mixture of gases, and to separate liquid solvents from a liquid solution of a liquid solvent and a dissolved solute. The development of membrane reverse osmosis processes for the desalination of sea and brackish water is one application of such fluid component separations in which considerable development has taken place.

Osmosis is a concentration equalization process in which fluid is transported through a semipermeable membrane (which is permeable to said fluid) from a region of greater concentration of said fluid to a region of lesser concentration of that fluid. For example, if sea water is placed on one side of a semipermeable membrane which is much more permeable to water than to the ions of the salts dissolved in sea water, and pure water is placed on the other side of the membrane, then the concentration equalization process of osmosis will result in a flow of pure water through the membrane into the saltwater region where the concentration of water is less.

In reverse osmosis, pressure in excess of the threshold pressure for a particular fluid and its concentration differential across a membrane permeable to it (termed osmotic pressure), is applied to the region of lesser concentration so that the normal osmotic flow is reversed. For example, using a semipermeable membrane which is much more permeable to water than to the ions of the salts dissolved in sea water, pressure in excess of the osmotic pressure may be applied to a region of sea water on one side of such a membrane, resulting in the concentration of the sale ions in the sea water, and allowing the recovery of relatively pure water from the other side of the membrane.

The basic principles of reverse osmosis have been relatively well understood for decades, but the development and construction of suitable semipermeable membranes capable of withstanding substantial pressures while providing both high degree of component selectivity and flow-through rate has provided difficulties for the full development of desalination processes. The materials principally employed for the construction of prior art reverse osmosis membranes have generally been organic cellulose derivatives such as cellulose acetate, cellulose propionate, cellulose acetate-butrate, and ethyl cellulose. Because of its relatively high flux and good salt exclusion characteristics, cellulose acetate has probably been most extensively used and studied in reverse osmosis membrane applications. High quality, imperfection-free cellulose acetate membranes, however, are difficult to prepare. By imperfections is meant openings in the semipermeable membrane through which the feed mixture may pass without any rejection of substances to which the membrane material is relatively less permeable.

In addition, semipermeable membranes such as cellulose acetate membranes often have limited pH ranges of operation because of adverse hydrolysis effects at pH values outside such limited ranges.

It is an object of the present invention to provide semipermeable membranes having improved resistance to hydrolysis over a wide pH range. It is another object to provide reverse osmosis membranes which are readily prepared in a substantially imperfection-free form, and processes of readily producing them. It is a further object to provide a wide spectrum of semipermeable membranes in which membrane characteristics such as component selectivity, fluid sorbtion, and fluid flow-through rate may be controlled and varied to fit the particular application.

Very generally, the instant invention provides semipermeable membranes prepared from a mixture of a vinylpyrrolidone polymer and a polyisocyanate, the mixture being cured with water under conditions of controlled humidity. Also provided are processes for producing such semipermeable membranes. Particularly useful polyisocyanates are "blocked" polyisocyanates which have decreased reactivity toward water at ambient temperatures, but which provide reactive polyisocyanate functionality toward water at elevated temperatures.

Vinylpyrrolidone is a vinyl monomer which may readily be polymerized through the vinyl group to form essentially linear, water-soluble vinylpyrrolidone polymers. Other vinyl monomers may, of course, be polymerized with vinylpyrrolidone to provide vinylpyrrolidone polymers with modified properties which are also useful herein. Vinylpyrrolidone polymers having a very broad range of molecular weights may be successfully employed in the various aspects of this invention. The molecular weight of the vinylpyrrolidone polymer employed is one parameter which may be varied to control the thickness and production characteristics of the membranes of the instant invention. Polymers with lower molecular weight are less viscous in solution than higher molecular weight polymers of the same chemical constituency, and this variation in solution viscosity may be advantageously employed in thin-film production. Preferred are those vinylpyrrolidone polymers which have a molecular weight of at least about 5,000 and which contain at least about 50 percent by weight polymerized vinylpyrrolidone. Particularly preferred are those polymers which have a molecular weight of at least about 10,000 and contain at least about 90 percent by weight polymerized vinylpyrrolidone. Polymers which have been found to be particularly useful herein, and which have excellent film-forming properties are homopolymers of vinylpyrrolidone. Preferred are those homopolymers of vinylpyrrolidone (polyvinylpyrrolidone) which have an average molecular weight in excess of about 100,000. The term vinylpyrrolidone as used herein includes mixtures of vinylpyrrolidone polymers.

The vinylpyrrolidone polymers useful herein are preferably in substantially anhydrous form prior to mixing with the polyisocyanate because it has been found that premature reaction of water with the polyisocyanate may thereby be prevented.

Polyisocyanates useful herein are those compounds having at least dual isocyanate functionality and which are soluble in suitable organic solvents such as chloroform, N, N' dimethyl formamide or acetone. Such polyisocyanate compounds, which have found extensive use in urethane coating and foam applications and which are described in that literature, are reactive toward compounds that have active hydrogen atoms, such as phenols, alcohols, amines and water. Examples of such polyisocyanate compounds useful herein are diisocyanates, such as hexamethylene diisocyanate, m-phenylene diisocyanate, 2,4-toluene diisocyanate, 2,6-toluene diisocyanate, methylene bis-(4-phenylisocyanate), dianisidine diisocyanate, and tolidine diisocyanate. Polymethylene polyphenylisocyanate is an example of a polyisocyanate useful herein which has more than dual isocyanate functionality. Isocyanate-capped prepolymers, such as those used in the manufacture of urethane foams, may also be advantageously employed herein. An example of such an isocyanate-capped prepolymer is the reaction product of excess toluene diisocyanate with 2-ethyl-2-hydroxy methyl-1, 3-propane-diol:

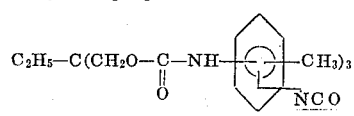

The term polyisocyanate as used herein includes mixtures of different polyisocyanates.

Isocyanates react with certain compounds having active hydrogen atoms to form compounds which are termed blocked isocyanates or "splitters" because the reaction is reversible at elevated temperatures. Blocked isocyanates are described in the literature, for example by J. H. Saunders abd K. C. Frisch, Polyurethanes: Chemistry and Technology, Part I, V. XVI, and in "High Polymers," Interscience Publisher, New York, 1962. Blocked polyisocyanates are particularly useful herein. The reaction product of a blocked polyisocyanate with water is considered herein to be included within the scope of the reaction product of the polyisocyanate, from which it may be produced. Phenol, guaiacol, and ε-caprolactam are examples of compounds which may be used for blocking the hereinabove described polyisocyanates to provide useful, blocked polyisocyanates. For example, ε-caprolactam-blocked polymethylene polyphenylisocyanate has been successfully reacted with water in the presence of polyvinylpyrrolidone to produce the semipermeable membranes of the instant invention.

In general there are two primary parameters by which the operating effectiveness of a semipermeable membrane separation means may be measured. The first is the percent of rejection by the membrane of the second component of the fluid mixture, which has the lower (and usually much lower) propensity to permeate through the semipermeable membrane than the first fluid component. This percent of rejection parameter is related to the relative permeabilities of the various components of the fluid mixture through the semipermeable membrane. The percent of rejection is defined as one hundred times the difference between the feed and product water concentrations divided by the feed water concentration. For example, in sea water, the ions which make up the salt are the second component or components. If salt water having an initial percentage of one weight percent sodium chloride is fed to a semipermeable membrane separation means and the liquid which permeates through that separation means has a sodium chloride content of 0.05 weight percent, the membrane is said to exhibit a 95 percent rejection of sodium chloride. The other parameter is a measure of the rate of flow permeating the membrane and is termed the membrane constant. For purposes of this application, the membrane constant is measured as grams of output liquid per square centimeter of membrane surface, second of operation, and atmosphere net pressure (applied pressure minus osmotic pressure). Accordingly, the membrane constant is hereafter stated in terms of $$\frac{g.}{cm.^2-sec.-atm.}$$

It should be realized, of course, that these two parameters are competing in a sense because it can be seen that generally a semipermeable membrane which allows a greater amount of fluid to pass through it (either as a result of its inherent chemical and/or physical structure or as a result of minor imperfections therein) may not be as discriminating in rejecting the second component, i.e., salt, as will a similar membrane which allows a lesser amount of fluid to flow through it at a given pressure. Of course, ideally a semipermeable membrane is most desirable which has both a very high percent of rejection and a very high membrane constant. However, for many purposes, one of these parameters may outweigh the other in specific importance so that, dependent upon the characteristic of feed mixture and upon the desired criteria of the product, a lower percent of rejection might be tolerated in order to obtain a higher product output from a membrane of given surface area. For example, when brackish water is used as the input feed mixture so that the concentration of dissolved solids is relatively low, a lower percent of rejection may be tolerated in order to achieve a fairly high output of drinking water having a dissolved solids content no higher than a certain desired level. Semipermeable membranes of this invention may be prepared having a wide range of combinations of percent of rejection and membrane constant, for example, through control of the amount and type of vinylpyrrolidone polymer and polyisocyanate material used, and the fabrication procedure. In addition, membrane characteristics may be varied by varying such parameters as the membrane thickness.

Curing of a mixture of a vinylpyrrolidone polymer and a polyisocyanate with water under controlled conditions of humidity provides an insoluble, hydrophilic material which, when placed in water at ambient temperature will absorb water and swell to a certain degree. In general, as the relative amount of polyisocyanate which is mixed with a vinylpyrrolidone polymer increases, a series of hydrophilic products is provided which have a decreasing tendency to swell when immersed in water. It has been found that membranes which have a water-sorption of less than about 40 percent, have improved ability to discriminate between feed-mixture components. Thus, these membranes having this limited tendency to sorb water have an improved semipermeable character with respect to membranes with a greater tendency to sorb water. The term water-sorption is used as a quantitive measure of the tendency of a membrane to swell when immersed in water. Water-sorption, as used herein, is defined as the weight percentage of water, based on the weight of the water-swollen membrane, sorbed at equilibrium by a membrane when it is immersed in water at 25° C. To produce the semipermeable membranes of this invention, a sufficient amount of polyisocyanate is mixed with a vinylpyrrolidone polymer and the mixture cured in a film form with water under conditions of controlled humidity to provide a membrane which has a water-sorption of less than about 40 percent. It is preferred that a sufficient amount of polyisocyanate be used to provide a membrane with a water-sorption of from about 10 percent to about 20 percent.

Various theories might be advanced to explain the formation and benefits of the membranes of this invention. However, although it is not intended that this invention be bound by explanation, it is believed that the mixture of vinylpyrrolidone polymer and polyisocyanate react principally with water to form a polymeric biuret and by-product carbon dioxide:

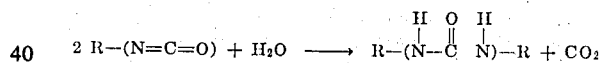

By controlling the conditions of humidity at which the membranes are cured the deleterious effect of too-rapid production of by-product carbon dioxide may be avoided. The biurets may react with additional isocyanate groups to further cross link or polymerize the polyisocyanates. Thus, it is theorized that the polyisocyanate polymerizes by reaction with controlled amounts of water, in the presence of a vinylpyrrolidone polymer, to provide a mixed, intertwined system of vinylpyrrolidone polymer and polymerized polyisocyanate. The relative insolubility of the vinylpyrrolidone polymers in such intertwined polymer systems may result from factors such as hydrogen bonding between the vinylpyrrolidone polymer and the polymerized polyisocyanate (coupled with their intertwined structure), or occasional reaction of isocyanate groups with the relatively acidic hydrogen at the number 3 position of the polymerized vinylpyrrolidone. Blocked isocyanates are believed to react similarly with water at sufficiently elevated temperatures to regenerate isocyanate functionality.

According to this theory, as the relative amount of polyisocyanate and its subsequent polymerization and crosslinking increases, the water-sorption of the intertwined polymer system decreases. It is also theorized that the water-sorbed in films with a high water-sorption of about 40 percent or more is present in the form of interconnected clusters which permit coupled flows of solvent and solute to occur. As sufficient polyisocyanate is utilized to provide membranes with water-sorptions decreasing from about 40 percent to about 20 percent, it is theorized that the water clustering diminishes, and that membranes having water-sorptions of less than about 20 percent have little coupled flow of solvent and solute and hence better solute exclusion characteristics. These theories are in no way limiting upon the scope of the invention, but rather are offered to illustrate a possible explanation for its advantages.

In any event, varying the ratio of a particular polyisocyanate used with a vinylpyrrolidone polymer will provide variation in the water-sorption of the resultant membrane. Generally, an increase in the relative amount of polyisocyanate will provide a decrease in water-sorption. In order to provide membranes having the desired semipermeable characteristics, sufficient polyisocyanate should be used to provide a water-sorption of less than 40 percent, and preferably from about 10 percent to about 20 percent.

The amount of polyisocyanate or blocked polyisocyante which is used to provide a membrane with a water-sorption of less than about 40 percent will vary depending upon the nature of both the vinylpyrrolidone polymer and the polyisocyanate or blocked polyisocyanate. For example, some important factors are the molecular weight of the vinylpyrrolidone polymer, and the nature of monomers (if any), other than vinylpyrrolidone incorporated into it, as well as the functionality (e.g., diisocyanate, triisocyanate, etc.) and other properties of the polyisocyanate or blocked polyisocyanate. In addition, the condition of humidity as well as the temperature at which the reaction takes place, i.e., the cure temperature, may also affect the water-sorption of the resulting membrane.

Although the proportions of the particular materials which will produce a membrane with the desired water-sorption may vary, the ratio of moles or isocyanate functionality of the polyisocyanate to moles of vinylpyrrolidone in the vinylpyrrolidone polymer (termed herein the "isocyanate equivalent") is usefully correlated with water-sorption. Such a correlation is particularly useful when membranes are produced from a homopolymer of vinylpyrrolidone and an aromatic polyisocyanate.

By proportioning the ratio of moles of isocyanate functionality of an aromatic polyisocyanate or blocked aromatic polyisocyanate to moles of polymerized vinylpyrrolidone in the vinylpyrrolidone polymer so that there is an isocyanate equivalent of at least about 0.25, membranes having a water-sorption of less than about 40 percent may usually be produced. An isocyanate equivalent of between about 0.4 and 2.0 is preferred. For example 1 mole of homopolymerized vinylpyrrolidone mixed with 0.45 mole of methylene bis-(4 phenylisocyanate) may be cured at 150° by air which has enough water vapor that it would have 5 percent relative humidity at 25° C., to provide a membrane with a water sorption of 18 percent. Since there are 2 moles of isocyanate functionality per mole of methylene bis-(4 phenylisocyanate), the isocyanate equivalent in the above example is 0.9.

The semipermeable membranes of this invention may vary in thickness from less than about 1 micron to more than about 200 microns, and may be employed in conventional reverse osmosis desalination apparatus of various designs. Flat sheet-like membranes may be employed in plate-and-frame devices, tubular membranes may be either prefabricated and inserted or cast in place on the inside of large porous wall tube devices, tubular membranes may be fabricated on the outside of the porous capillary tubes of small tube devices, and large flat or tubular membranes may be fabricated for use in spiral-wound modules. Thinner membranes are preferred because they generally exhibit a higher membrane constant than a thicker membrane for a given percent of rejection. The thinner membranes may require support during use, particularly at relatively high operating pressures, for example by being disposed against a porous support membrane. Membranes having a thickness of less than about 50 microns are preferred. Particularly preferred are those membranes having a thickness of less than about 10 microns.

The semipermeable membranes of this invention are prepared by mixing a vinylpyrrolidone polymer with a polyisocyanate and curing a film of the mixture under conditions of controlled humidity. Although the finished membranes may be bent of folded, their shape becomes substantially fixed during the reaction, and therefore should be fabricated into a thin film before this is prevented by the progress of the reaction.

One suitable method for fabricating these membranes is coating a suitable substrate with a solution of the polyisocyanate and vinylpyrrolidone polymer (known as casting) followed by evaporation of the solvent from, and curing of the film under suitably controlled conditions of humidity. The substrates which may be employed include those having a smooth surface which will be unaffected by the casting solution and which will either naturally allow release of the semipermeable membrane after solvent removal and curing, or which can be suitably treated with a releasing agent to effect such a release. Examples of suitable substrate materials include glass, metals such as stainless steel, and plastics such as Teflon (polytetrafluoroethylene). When the substrate is a porous support membrane, it is of course not necessary that the membrane be released from its surface. The desired membrane thickness may readily be obtained through control of the solution concentration and of the thickness of the later of solution applied to the substrate. Preferred methods of coating the substrate with a solution of the vinylpyrrolidone polymer and polyisocyanate are those, such as dipping and spraying, which will provide an even coating and thereby result in the production of a membrane with uniform thickness.

Polyisocyanates are very reactive toward water, and if the polyisocyanate reacts with excessive water prior to casting, the membranes will have a tendency to coagulate and form holes as the solvent evaporates. In order to cast substantially imperfection-free membranes from solution, therefore, it is advantageous to dissolve the vinylpyrrolidone polymer and the polyisocyanate in a dry solvent prior to casting. The vinylpyrrolidone polymer and polyisocyanate are proportioned in this casting solution so that a membrane having the desired water-sorption will be produced.

When membranes are cast in this manner, the vinylpyrrolidone polymer and the polyisocyanate may be dissolved in any suitable dry solvents or mixtures thereof which do not have a deleterious effect on the vinylpyrrolidone polymer, polyisocyanate or the curing of the membrane. It is noted that water has a deleterious effect upon the polyisocyanate, so that the suitable solvents used to dissolve either the vinylpyrrolidone polymer or the polyisocyanate should be substantially anhydrous. In the event that different solvents or mixtures thereof are used to prepare the solution of vinylpyrrolidone polymer and polyisocyanate, these solvents should be selected so that the mixture forms a homogeneous solution suitable for casting of a membrane. Examples of suitable solvents are substantially anhydrous N, N' dimethyl formamide, chloroform, and pyridine.

The concentration of the vinylpyrrolidone polymer-polyisocyanate mixture in the casting solution may be varied to fit the requirements of the particular membrane casting operation. For example, if the casting operation involves the application of a particular thickness of the casting solution to a substrate (such as by a doctor blade) the thickness of the finished membrane may be controlled through variation of the concentration of the casting solution. If the solution viscosity plays an important part in the casting operation, such as in spraying or dipping, the proper viscosity may be selected through control of the molecular weight and concentration of the vinylpyrrolidone polymer and polyisocyanate in the casting solution. After the casting solution has been applied to the substrate, the solvent is evaporated therefrom, and the resulting uncured membrane film is cured under controlled conditions of humidity to provide semipermeable membranes. By controlled conditions of humidity is meant conditions of limited humidity at which the rate of cure of the membrane is lower than that at which the rate of production of the gaseous by-product (carbon dioxide) causes the membrane to blister or form imperfections. A useful method of controlling the conditions of humidity is to cure the membrane in an atmosphere which contains limited amounts of water vapor. For example, a preferred method is to cure the membrane in an atmosphere in which there is only enough water vapor present to provide, at 1 atmosphere of pressure and 25° C., a relative humidity of less than about 50 percent, and preferably between about 5 percent and about 20 percent. By relative humidity is meant the ratio of the vapor pressure of water present in that atmosphere at a given temperature to the maximum saturation vapor pressure of water in that same atmosphere at the same temperature. Air and nitrogen are useful atmospheres, although the use of other atmospheres is also contemplated. Also contemplated are other methods of controlling humidity such as by curing the membranes with water vapor, or a mixture of water vapor and other gases, at reduced pressures so that the concentration of water vapor is reduced below that at which the rate of formation of carbon dioxide in the membrane will blister or cause imperfections during curing.

Heat may be applied to facilitate the removal of solvent from the film of casting solution, or to facilitate the cure of the membrane, or both. The temperature at which the membrane is cured may affect the properties of the cured membrane. While the polyisocyanate is very sensitive to water so that final curing may be effected for example at room temperature, it is preferred that the membrane be heated to an elevated temperature below the decomposition temperature of the membrane. A preferred range of curing temperatures is between about 35° C. and about 175° C.

For example, a substantially anhydrous solution of a vinylpyrrolidone polymer is mixed with a polyisocyanate solution to form a casting solution containing a sufficient amount of polyisocyanate to provide a membrane having a water-sorption of less than about 40 percent. A film of the casting solution is rapidly cast on a glass plate in a chamber in which relatively dry air of about 5 percent to about 50 percent relative humidity at 25° C. and 1 atmosphere of pressure is passed over the surface of the film. After about 8 hours of drying, the films are heated in a hot air oven at 120° C. for 4 hours to facilitate complete solvent removal and membrane cure. Unless the membrane has been cast in place, for example on the inside of a large, porous-wall tube, it is removed from the substrate after curing and is ready for use. For very thin membranes having a thickness of less than about 10 microns, which may require the use of a porous support membrane for high pressure operation, it may be advantageous to cast a porous support membrane directly on the outer surface of the cured membrane prior to its removal from the substrate. In this way, removal of the very thin membrane from the substrate and handling of the membrane are greatly facilitated.

Imperfection-free membranes of high quality are produced by the above-described process of casting and curing membranes from solutions of vinylpyrrolidone polymers and polyisocyanates.

An alternative process, to circumvent the limitations of casting membranes from solution which arise because of the sensitivity of the polyisocyanate to water which may be in the casting solution or in the atmosphere during casting, upon contact with water, involves the use of a blocked polyisocyanate. As mentioned hereinabove, polyisocyanates may be blocked by reacting certain types of active hydrogen compounds with the isocyanate groups. Such blocked polyisocyanates do not react with water at room temperatures, but have limited thermal stability so that the isocyanate groups can be regenerated at elevated temperatures so that the membranes may be cured. A casting solution of a vinylpyrrolidone polymer and a blocked polyisocyanate may be stored at room temperature, and cast when convenient, even in the presence of moisture. The solvent is then evaporated and the membrane is cured by raising the temperature of the vinylpyrrolidone polymer-blocked polyisocyanate film to at least the temperature range at which the polyisocyanate is regenerated from the blocked polyisocyanate, usually from about 140° C. to about 160° C. Through the use of blocked polyisocyanates, the deleterious effect of the progress of the cure upon the casting of membranes from solution may be completely eliminated. For example, ultrathin and asymmetric membranes which are substantially imperfection-free may be readily prepared. In addition, the use of blocked polyisocyantes facilitates the continuous casting of membranes without having humidity control during casting. Membranes with water-sorption values of less than about 20 percent, prepared from relatively larger amounts of blocked polyisocyanate, are readily fabricated, even in ultrathin form, and are substantially imperfection-free.

The following examples include detailed descriptions of semipermeable membranes and processes for preparing them which embody various features of the invention. It should be understood, however, that the following examples in no way limit the scope of the invention which is defined solely by the claims appearing at the end of this specification.

EXAMPLE I

Anhydrous polyvinylpyrrolidone (PVP) with an average molecular weight of 360,000 is dissolved in an anhydrous solvent consisting of equal volumes of pyridine and N, N'-dimethyl formamide. Methylene bis-(4 phenyliso-cyanate) (MDI) is dissolved in an anhydrous solvent also consisting of equal volumes of pyridine and N,N'-dimethyl formamide to form a series of solutions having different concentrations. The polyvinylpyrrolidone solution is mixed with the series of MDI solutions to provide a series of 3 casting solutions each containing 13.5 weight percent PVP, and varying amounts of MDI. These 3 casting solutions are each immediately cast on clean glass plates in a chamber in which air containing an amount of water vapor such that it would have a relative humidity of 10 percent at 25° C and 1 atmosphere of pressure, is passed over the surface of the film-coated plates. After 8 hours of drying in this chamber, the films are heated in an oven at 120° C. for 4 hours. The cured semipermeable membranes are removed from the glass plates by soaking in water, and are transparent, strong and imperfection-free. The water-sorption of each membrane is measured by soaking the membrane in distilled water for 48 hours at room temperature, blotting the membrane and then weighing it. The water is then removed from the membrane at room temperature under vacuum over calcium sulfate and the membrane is weighed again. The water content of the membrane when swollen with water at room temperature at equilibrium is then obtained by difference, and the water-sorption is then determined as a weight-percent, based on the weight of the water-swollen membrane. Reverse osmosis experiments are performed on each membrane using a test separation device generally similar to that described in U. S. Pat. No. 3,133,132. A 0.8 weight percent aqueous sodium chloride solution is fed to the separation device adjacent to the semipermeable membrane at a pressure of 34 atmospheres, and a sufficient flow of this feed solution is maintained past the membrane to keep the effect of the boundary layer at a low level. The membrane constant and the percent of salt rejection are calculated for each membrane from the flow rate through the membrane and the salt concentration in the output fluid. The following Table I presents the data for these membranes. The "Isocyanate equivalent" heading represents the ratio, present in each of the casting solutions used to prepare the membranes, of moles of isocyanate groups of the MDI, to moles of pyrrolidone groups.

TABLE I

| Semipermeable membrane number | Isocyanate equivalent | Thickness (microns) | Water-sorption (percent) | Membrane constant assuming 0.2μ membrane thickness (g./cm.$^2$-sec.-atm.) | Salt rejection (percent) | Water permeability ($10^{-1}$g./cm.$^2$-sec.) | Sodium chloride permeability ($10^{-10}$cm.$^2$/sec.) |
|---|---|---|---|---|---|---|---|
| 1 | 0.448 | 15 | 31 | 9.95×10$^{-5}$ | 35.8 | 27.00 | 1,400.00 |
| 2 | 0.620 | 80 | 26 | 3.69×10$^{-5}$ | 58.0 | 10.00 | 209.00 |
| 3 | 1.100 | 57 | 16 | 6.26×10$^{-6}$ | 99.05 | 1.70 | 0.47 |

EXAMPLE II

A series of three semipermeable membranes is prepared and tested exactly as in Example I except that polymethylene polyphenylisocyanate (PMPI) is used as the polyisocyanate instead of methylene bis-(4-phenylisocyanate). The "Isocyanate equivalent" heading represents the ratio, present in each of the casting solutions used to prepare the membranes, of moles of isocyanate groups of the PMPI, to moles of pyrrolidone groups. The cured membranes are transparent, strong and imperfection-free. Table II presents the data for these membranes.

TABLE II

| Semipermeable membrane number | PMPI equivalent | Water-sorption (percent) | Membrane constant assuming 0.2μ membrane thickness (g./cm.²-sec.-atm.) | Salt rejection (percent) | Water permeability ($10^{-7}$g./cm.²-sec.) | Sodium chloride permeability ($10^{-10}$cm.²/sec.) |
|---|---|---|---|---|---|---|
| 1 | 0.45 | 34 | $9.21 \times 10^{-5}$ | 52.4 | 25.0 | 655.0 |
| 2 | 0.70 | 28 | $3.13 \times 10^{-5}$ | 72.3 | 8.5 | 94.0 |
| 3 | 1.20 | 17 | $8.11 \times 10^{-6}$ | 97.25 | 2.2 | 1.8 |

EXAMPLE III

A series of casting solutions each containing 15 percent polyvinylpyrrolidone (PVP) and different amounts of polymethylene polyphenylisocyanate which has been blocked by reaction with ε-caprolactam (Blocked PMPI) is prepared using chloroform as the solvent. These casting solutions are stable at room temperature, and casting need not take place in an anhydrous environment in order to prepare imperfection-free films. These casting solutions are each cast on clean glass plates in a chamber in which substantially dry air is passed over the surface of the film-coated plates. When the films have dried completely, a corner of each is tested to find that they remain soluble in chloroform, indicating that reaction has not taken place. The films are then heated to 150° C. for 30 minutes in the presence of air containing a sufficient amount of water vapor to provide a relative humidity of about 20 percent at 1 atmosphere to pressure and the membranes thus produced are removed from the glass plates by soaking in water. They are then tested as in Example I.

The "Isocyanate equivalent" heading represents the ratio, present in each of the casting solutions, of moles of ε-caprolactam blocked isocyanate groups to moles of pyrrolidone groups. The cured membranes are transparent, strong and imperfection-free. Table III presents this data for these membranes.

TABLE III

| Semipermeable membrane number | Isocyanate equivalent | Thickness (microns) | Water-sorption (percent) | Membrane constant assuming 0.2μ membrane thickness (g./cm.²-sec.-atm.) | Salt rejection (percent) | Water permeability ($10^{-7}$g./cm.²-sec.) | Sodium chloride permeability ($10^{-10}$cm.²/sec.) |
|---|---|---|---|---|---|---|---|
| 1 | 0.3 | 80 | 37 | $1.88 \times 10^{-4}$ | 37.5 | 51.0 | 2,450.00 |
| 2 | 0.7 | 80 | 29 | $5.94 \times 10^{-5}$ | 64.3 | 15.3 | 245.00 |
| 3 | 1.2 | 115 | 22 | $8.11 \times 10^{-6}$ | 97.2 | 2.2 | 1.80 |
| 4 | 1.6 | 65 | 17 | $6.63 \times 10^{-6}$ | 98.8 | 1.8 | 0.63 |

EXAMPLE IV

Six membranes are prepared following the procedure of Example I. These membranes have an isocyanate equivalent of 1.1 and correspond to membrane 4 of Example I. These membranes are placed in acid or base solutions ranging in pH from 1.9 to 12.4. After immersion in these solutions for 17 days the pH of each solution is found to be unchanged and the permeability to NaCl is determined. Table 4 presents data for these membranes.

TABLE IV

| Membrane No. | pH of Storage Water (acid or base used) | NaCl permeability ($10^{-11}$ cm²/sec) |
|---|---|---|
| 1 | 1.1 (HCl) | 4.6 |
| 2 | 4.0 HCl | 4.3 |
| 3 | 6.7 (distilled water) | 4.7 |
| 4 | 10.0 (NaOH) | 4.0 |
| 5 | 11.0 (NaOH) | 3.1 |
| 6 | 12.4 (NaOH) | 4.9 |

Under the pH conditions to which membranes 01, and 4–6 are exposed, cellulose acetate would be converted to cellulose in a few hours and be completely destroyed for desalination purposes.

EXAMPLE V

A sufficient amount of polyvinylpyrrolidone (PVP) and ε-caprolactam blocked polymethylene polyphenylisocyanate (Blocked PMPI) are dissolved in choroform to provide a casting solution containing only 0.50 percent by weight, based on the weight of the total solution, of PVP and Blocked PMPI. The ratio of ε-caprolactam blocked isocyanate groups to polymerized vinylpyrrolidone groups is 0.28, sufficient to provide a membrane with a water-sorption of about 38 percent. The PVP (which is identical to that used in Example I), the Blocked PMPI, and the chloroform are all substantially anhydrous, and the casting solution prepared from them is kept in a dry atmosphere. A clean, flat glass plate is immersed in this casting solution for five minutes and then is withdrawn vertically into a dry, dust free chamber. The excess solution drips from the glass plate back into the solution container, leaving a thin, uniform coating of this very dilute casting solution on the glass plate.

The chloroform solvent is allowed to evaporate and the ultrathin semipermeable membrane is cured on the glass plate by heating to a temperature of 150° C. for 30 minutes in air containing a sufficient amount of water vapor to provide a relative humidity of about 20 percent at 25° C. and 1 atmosphere of pressure. A porous support membrane composed of cellulose nitrate and cellulose acetate is then cast directly on the ultrathin membrane while it is still adhering to the glass plate. The composite membrane, i.e., the combination of the ultrathin semipermeable membrane and the porous support membrane, is readily removed from the glass plate by soaking in water. This composite membrane is tested by means of the test device used in Example I with the membrane side of the composite oriented toward the feed mixture. The feed mixture consists of a 1.7 percent sodium chloride solution at 24° C. applied at a pressure of 500 p.s.i. The resistance to solution flow through the porous support membrane is small in comparison with that of the semipermeable membrane. The thickness of the semipermeable membrane is estimated to be between 2 to 5 microns. The salt rejection is 60 percent and the membrane constant is $0.66 \times 10^{-5}$ g./cm.²-sec.-atm.

The percent of salt rejection predicted for this membrane by assuming a solution-diffusion membrane mechanism, and based on the permeability ratio of water and sodium chloride, was only about 20 percent.

EXAMPLE VI

A porous support membrane (millipore VFWP) is sprayed on the small-pore side with a 1.4 percent, by weight, solution of polyacrylic acid (molecular weight 50,000) dissolved in equal volumes of water and ethanol. The coated support membrane is then dried. The polyacrylic acid coating is then coated with a 0.13 weight percent solution of polyvinylpyrrolidone (PVP-the same as that used in Example I) and polymethylene polyphenylisocyanate (PMPI) having a relative amount of PMPI sufficient to provide an isocyanate equivalent of 1.2. The coating of the PVP-PMPI film takes place in a controlled humidity box containing air with relative humidity of 10 percent at 25° C. The composite membrane is then heated to 100° C. for 15 minutes and tested by means of the device described in Example I using a 1 percent by weight sodium chloride solution as a feed solution at an operating pressure of 800 p.s.i. The membrane has a salt rejection of 96 percent and a membrane constant of $0.17 \times 10^{-5}$ g./cm.$^2$-sec.-atm.

The semipermeable membrane separation means which are described in this application may be employed for treating a variety of feed mixtures, such as mixtures of two or more gases, mixtures of two or more liquids, for example water and organic liquids, liquids wherein solutes are dissolved, as for example sea water, fruit juices, whey, and acid mine waters. However, the operation thereof is sometimes hereinbefore described with reference to sea water or saline water, one important present use for such semipermeable membranes. The term "feed mixture" as used in this application, includes mixtures of liquids regardless of their mutual solubility, mixtures of different gases, and solutions wherein mixture of a solid and a liquid results in the dissolution of a solid as a solute in the liquid, as well as combinations of the foregoing. Included within the scope of feed mixtures from which separations may be obtained by the instant invention are emulsions, suspensions, and biological media such as bacterial, viral and fungal cultures.

Imperfections and deleterious to semipermeable membrane performance, particularly at the high pressures desired for reverse osmosis applications. Practice of the disclosed process readily produces semipermeable membranes which may be substantially imperfection-free. The resultant semipermeable membranes exhibit excellent hydrolysis-resistance which allows useful operational lifetimes for use in a pH range of from about 1.5 to about 12.5, thus providing a wide scope of usefulness for practical semipermeable membrane technology. An additional advantage is that membranes of this invention may be specifically "tailored" to a particular need. Membranes having a wide range of properties, such as membrane constant, percent of rejection, etc., may readily be prepared for a particular engineering application.

Various features of the invention are set forth in the claims which follow.

What is claimed is:

1. A process for producing a semipermeable membrane comprising:
   a. preparing a solution of a vinylpyrrolidone polymer and blocked polyisocyanate,
   b. coating a substrate with a film of said solution,
   c. evaporating the solvent from said film to provide a membrane film,
   d. heating said membrane film to a temperature at which said blocked polyisocyanate is converted into a polyisocyanate, and
   e. curing said membrane film under conditions of controlled humidity wherein the moisture concentration is insufficient to promote too rapid a reaction of water with the polyvinylpyrrolidone and polyisocyanate which would cause blistering or imperfections in the membrane.

2. A process according to claim 1 wherein the ratio of blocked isocyanate groups to polymerized vinylpyrrolidone groups is greater than about 0.25.

3. A process according to claim 1 wherein said curing is carried out in an atmosphere containing sufficient water vapor to provide said atmosphere with a relative humidity of less than about 20 percent at 25.20 C.

4. A process according to claim 3 wherein said vinylpyrrolidone polymer is a polyvinylpyrrolidone having an average molecular weight in excess of about 100,000, wherein said ratio is between about 0.4 and about 2.0, and wherein said temperature is from about 140° C. to about 175° C.

5. A process according to claim 4 wherein said blocked polyisocyanate is the reaction product of a polyisocyanate with ε-caprolactam.

6. A process according to claim 4 wherein said polyisocyanate is a blocked polymethylene polyphenylisocyanate.

* * * * *